Figure 1:
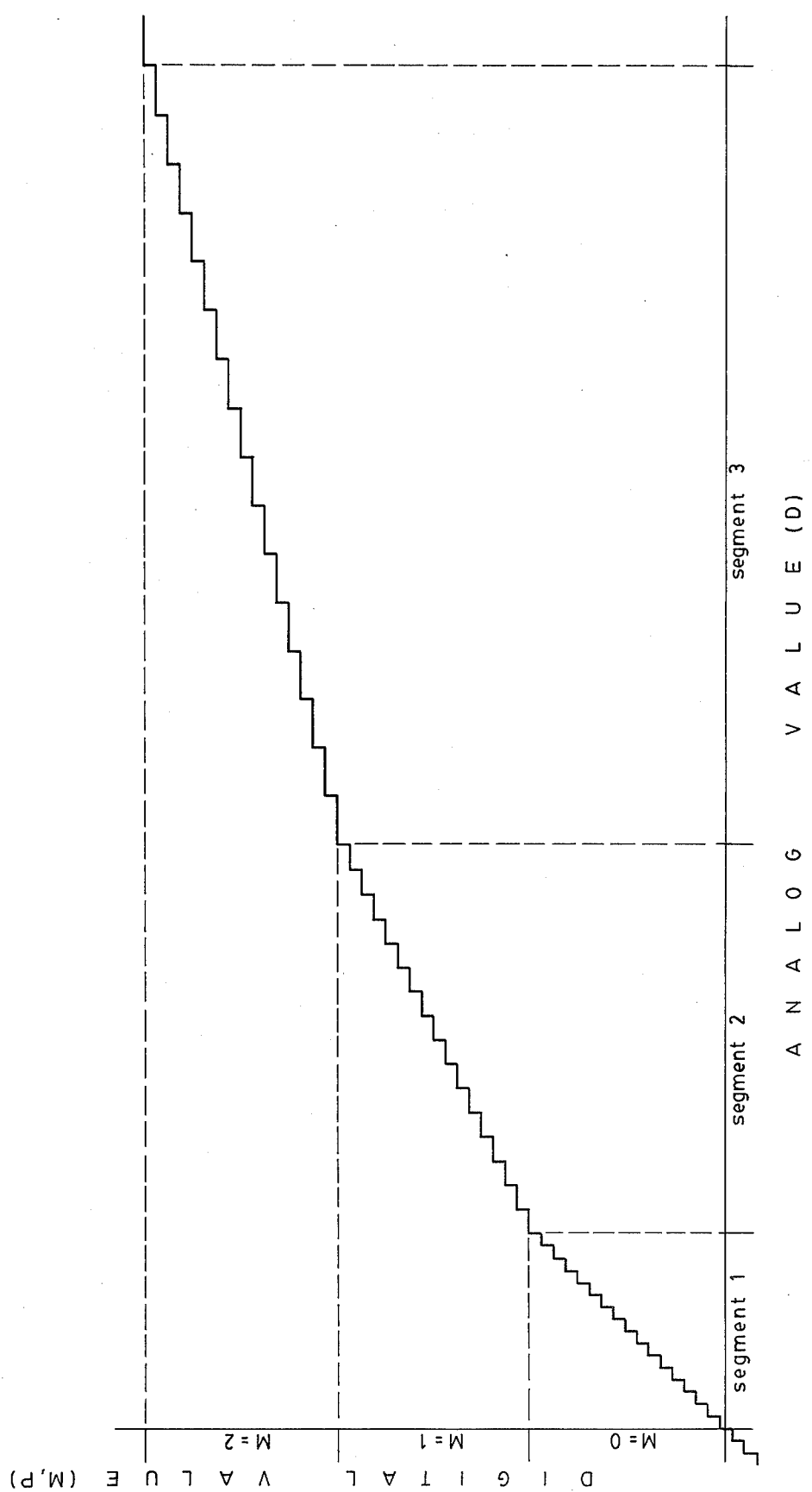

United States Patent [19]

Davis et al.

[11] 4,230,908
[45] Oct. 28, 1980

[54] TELEPHONE SUMMING CIRCUIT

[75] Inventors: John Christopher H. Davis, Oakridges; Richard A. Hatherill, Toronto, both of Canada

[73] Assignee: Plessey Canada Limited, Downsview, Canada

[21] Appl. No.: 5,307

[22] Filed: Jan. 22, 1979

[51] Int. Cl.³ .............................................. G06F 7/50
[52] U.S. Cl. .................................. 179/1 CN; 364/768
[58] Field of Search ........................ 179/1 CN, 1 B; 340/347 DD; 364/768

[56] References Cited

U.S. PATENT DOCUMENTS 3,575,591  4/1971  Chatelon et al. .................... 364/768
4,091,452  5/1978  Maggi ................................. 364/768
4,163,871  8/1979  Maggi ............................... 179/1 CN

OTHER PUBLICATIONS

A. Assimus et al., "Digital Conference Network," IBM Tech. Discl. Bull., vol. 17, No. 10, pp. 2967–2969, 1975.

Primary Examiner—Malcolm A. Morrison
Assistant Examiner—E. S. Kemeny

[57] ABSTRACT

The addition of two digitized audio signals, each of which has been non-linearly compressed and PCM encoded, is accomplished by converting only one of the signal samples (preferably the smaller) to an exponential-format value which may be linearly added to the other.

15 Claims, 2 Drawing Figures

TELEPHONE SUMMING CIRCUIT

This invention relates to the telephone art and to the addition of two audio samples. The "party" may be a voice or a tone.

The invention is useful in the type of telephone system wherein the audio samples are converted from analog form to digital form at the originating end for transmission through the system, and reconverted to analog form for listening at the terminating end.

Such signals are in digital form as the result of a sampling process well known to those skilled in the art, and such digital samples are in the form of an eight-bit binary PCM (pulse code modulation) code word with the bits (by convention well known to those skilled in the art) assigned the following values:

| PCM WORD BIT | 1 | 2 3 4 | 5 6 7 8 |
|---|---|---|---|
| DESCRIPTION | POLARITY OR SIGN | SEGMENT NUMBER OR MULTIPLIER | SEGMENT VALUE OR PROPORTIONAL VALUE |
| DESIGNATION | (S) | (M) | (P) |

For the purpose of this application, the polarity or sign is designated as "S", the segment number or multiplier is designated as "M", and the segment value or proportional value is designated as "P". There are eight positive and eight negative segments numbered serially, in each sense from the zero analog level.

(The invention is equally applicable to PCM code of more or less than eight bits where the number of bits to represent "M" or "P" or both is more or less than that specified above).

The two audio samples combined may originate in the voices of two parties to a conference call, with a pair of tones combined to make a third tone, a for multifrequency signalling or a combination of a voice and a tone. The invention, in other words, is not dependent upon the sources or character of the audio samples. The most common use of the invention is thought to be in combining two voices in a conference call.

Figure 2:
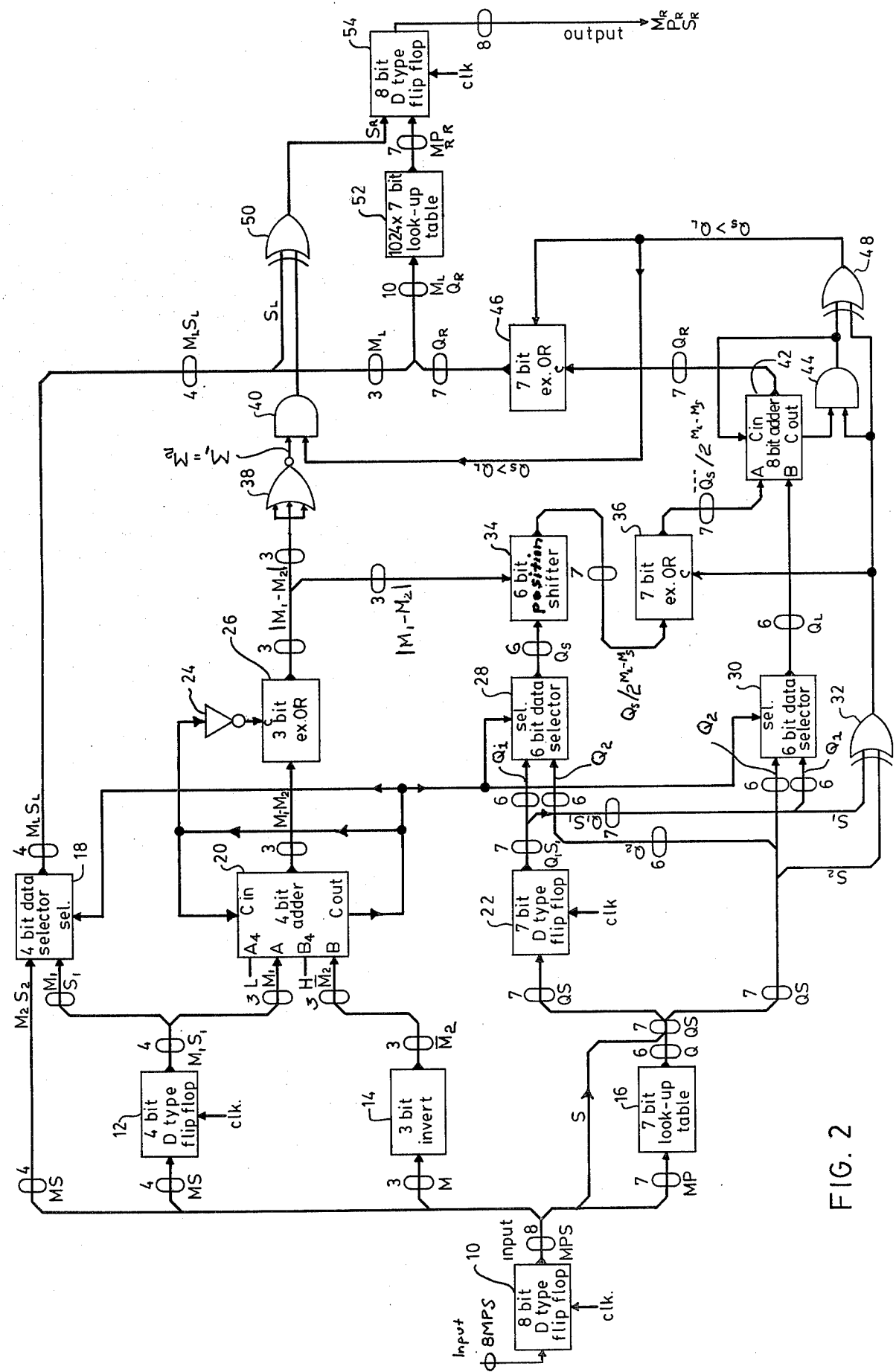

In the drawings:

FIG. 1 demonstrates the relationship of analog to digital values for the PCM code referred to; and FIG. 2 shows a partially schematic view of a circuit in accord with the invention.

The drawings are introduced in this, the introductory portion of the application, in order to refer to FIG. 1 and the PCM coding method.

FIG. 2 shows an approximate graph of the first three positive segments of an encoding law to produce PCM code words. It will be noted that each segment of increasing analog level is twice the analog input range of the preceeding segment, so that each increment of digital value represents an increment of analog level which, in a segment, is twice the increment of analog level in the next lower numbered segment.

There are two PCM coding laws in general use, $\mu$-law and A-law. The formula for deriving the decoded value "D" from the PCM code is:

$$(\mu\text{-law}) \ D = (2P + 33 - \frac{33}{2^M}) \ 2^M$$

-continued
$$(A\text{-law}) \ D = (2P + 33) \ 2^M \quad M \neq 0$$
$$D = 2P + 1 \quad M = 0$$

where, in the case of each law, M is the segment number or multiplier and P is the segment value or proportional value.

The two laws give slightly differing values for D. FIG. 1 is not quite accurate for either law but does portray the approximate relationship between the digital and analogue value for the various segments.

Since the encoding law or relationship between analog and digital values is non-linear, the digital values of signals from two different sources on a conference call cannot be directly added.

One method previously suggested of combining such signals from two sources is to convert the two sequences of PCM words back into analog signals for addition. After addition, the result word is again converted to digital PCM for processing by the telephone system before conversion into analog form for the listener. However, such extra reconversion into digital values has been found to be cumbersome, expensive and, in practice, increases distortion.

Another method for adding two series of PCM words, i.e. successive pairs of PCM words representing the speech of two different speakers, is to linearize the samples represented by PCM words to a 12 bit (A-law) or 13 bit ($\mu$ law) digital equivalent of the eight bit PCM code, add the values of the two linearized samples digitally, and then reconvert to a PCM code. However, this is relatively costly in hardware, due to the need to handle the 12 or 13 bit word.

Other prior approaches to the problem are discussed in the following publications:

"A Digital Conference Circuit for an Instant Speaker Algorithm," S. G. Pitroda and B. J. Rekiere IEEE Transactions on Communication Technology, Vol. COM-19, No. 6, December 1971, and the prior publications there referred to.

"Conference Fundamentals for Digital PABX Equipments," Remo J. D'Ortenzio, Stromberg-Carlson Corporation and prior publications there referred to.

"A Multiport Telephone Conference Bridge," William P. Kuebler, IEEE Transactions on Communications Technology, Vol. COM-16, No. 1, 169–172, February 1968, and prior publications there referred to.

This invention provides a novel means and method for purposes of conference calls for adding pairs of digital voice samples in the form of PCM words. The novel means and method operates on the principle that, if the segment values for two samples, P, from the two PCM words are in the same segment, they may be added since digital increments of P represent equal analog increments. If the segment values for two samples from the two PCM words are in different segments, then one of the sample values (preferably the smaller) may be converted to a value which may be linearly added to the other. Such process, including the subsequent addition, is carried on cyclically. After each addition, the value of the sum is used for the production of a corresponding PCM word representing the sum of the voice samples. The new series of PCM words will, of course, be used to produce the analog signals representing to a third listener, the combined audio signals contemporaneously provided by two speakers.

More specifically, the new means and method may be explained in terms of the formulae for the decoded values of the PCM words, which formulae are:

$$\mu\text{-law } D = (2P + 33 - \frac{33}{2^M}) \quad 2^M$$
$$A\text{-law } D = (2P + 33) 2^M \quad \text{for } M \neq 0$$
$$D = (2P + 1) \quad \text{for } M = 0$$

For the purposes of the invention, whichever coding law is in use, the portion of the above formulae in brackets is represented by Q in the subsequent discussion.

The addition of two samples, in either code, is therefore represented by the expression:

$$D_x + D_y = Q_x \cdot 2^{M_x} + Q_y \cdot 2^{M_y}$$

If one of the quantities to the right of the equation is converted to a value having a factor with the same power of 2, then:

$$D_x + D_y = \frac{Q_x \cdot 2^{M_y}}{2^{M_y - M_x}} + Q_y \cdot 2^{M_y}$$

then the expression may be written:

$$D_x + D_y = (\frac{Q_x}{2^{M_y - M_x}} + Q_y) 2^{M_y}$$

and the quantities inside the brackets may be added. The results of the addition, together with the value of (here) $M_y$, may be used to provide the PCM word representing the sum of the values of the two original PCM words. Improved practical results and accuracy are obtained if the Q corresponding to the smaller M is divided for addition to the other Q, that is, if $M_x$ is selected ($Q_x$ corresponding thereto) as the smaller M of the two.

In accord with the invention, therefore, there are provided means for utilizing the PCM words from the two sources, the M and P values for PCM word being supplied to the input of a convertor for conversion to an output value of Q. Means are provided for determining the values of M, for each sample, and means, preferably a binary bit position shifter, is connected to receive these values and provide the value $Q_x/2^{M_y-M_x}$.

The latter value and $Q_y$ are supplied to an adder for addition and the resultant sum, together with $M_y$, is provided to the input of a convertor connected to produce at its output, signals to allow the forming of the new PCM word representing the sum of the values of the original words. Logic is provided, operated by the same circuitry, to produce the sign of the two PCM words. The circuitry, above described, operates cyclically during the progress of a conference call. Such circuitry may be provided for each pair of callers whose signals are to be added (i.e. whose voices are to be combined). Alternatively, a circuit may serve a number of pairs of callers, or conference calls on a time shared basis.

By 'binary bit position shifter' we refer to a device which will record a series of binary signals representing a binary number and, in response to a control signal will shift the binary number down or up (this is down in the preferred embodiment of the invention) a number of binary places determined by the control signal. Although such definition would include a shift register, shift register is thought to be too slow for almost all applications of the invention. A binary position shifter which is practicable for use with the invention is designed to shift the recorded number one or a number of binary places in a single operation. Such a binary bit position shifter is produced under the designation '8 Bit Position Scaler' by Signetics Corp., a subsidiary of U.S. Philips Corp., P.O. Box 9052, 811 East Arguis Ave., Sunnyvale, Calif. 94086. (It will be noted that this invention uses seven of the eight bits).

Preferably, the $Q_x$ value (corresponding to $M_x$) which is divided by $2^{M_y-M_x}$ is the one corresponding to the smaller M value. Thus, the preferred circuit will provide means for determining, for two PCM words, the larger and smaller M values $M_L$ and $M_S$ respectively, and the value $M_L - M_S$ representing the number of binary places which the value $Q_S$ (i.e. the value Q from the same PCM code word as $M_S$) is to be shifted down.

A preferred embodiment of the invention is shown in FIG. 2.

In FIG. 2, the connecting lines and arrows represent a plurality of lines, whose character and number is indicated by the labelling. Thus, the input line marked "8MPS" indicates 8 lines each of which will have a binary state of 1 and 0. It will be understood from the previous explanation of the PCM code, that one line will carry a binary digit indicating the sign (S), three lines will carry binary digits representing the segment number (M) (serially numbered in each polarity from analog value zero), and four lines will carry binary digits representing the value in the segment (P). It will also be realized that, elsewhere in the diagram, where S, M, or P are part of the label, sometimes in combination with other designations, that the lines relevant to S, M and P respectively number 1, 3 and 4 respectively.

The two PCM words to be summed will appear sequentially on the input line. For convenience, PCM words will bear the subscript '1' or '2' for words 1 and 2 respectively.

In FIG. 2 the input receives a PCM word comprising M, P and S lines. In accord with the preferred method of operation of the invention, the input is received at an 8 bit 'D' type (i.e. edge operated) flip-flop '10'. Flip-flop '10' is clocked to pass to the circuitry to be described, the eight binary signals present at its input at the clock times. The M and P lines are supplied to the input of 7 bit look-up table '16'. This table is a convertor which may be hard wired. Such a hard wired convertor could be of a number of forms including a look-up table using a large array of diodes or could be hard wired logic using a combination of simple gates. However, it is preferred to use as such convertor, a programmable read only memory (PROM). Whichever type of convertor is used, it will be designed to provide for a given combination of M and P binary values on its seven input lines, a corresponding value of Q (whether under μ-law or A-law). Since in either law the value of Q is in one-to-one correspondence with given combination of P and M, the change of a circuitry from μ-law to A-law or vice versa merely requires a convertor with different output values and corresponding changes (which will be obvious to those skilled in the art) in other circuit components.

The convertor or look-up table '16' will produce $Q_1$ from the sample values $M_1$, $P_1$. The value $Q_1$ (6 bits) together with the sign $S_1$ appears at the inputs of a 7 bit D type flip-flop '22'. (The line for the sign signal S from the flip-flop '10' by-passes convertor '16').

At the same time the bits representing $M_1$ and $S_1$ appear at the inputs of a four bit 'D' type flip flop '12'.

Thereafter, the flip-flops '12' and '22' are clocked providing at the output of flip-flop '22', the signals representing $Q_1$, $S_1$ to one of the 6 bit inputs of each of data selectors '28' and '30'; and providing from flip-flop '12' the signal $M_1 S_1$ to four bit input of data selector '18' and three bit signal $M_1$ to four bit adder '20'.

When the second PCM word appears at the output of flip-flop '10' as the result of a second clock signal, the out of the 7 bit look-up table supplies $Q_2$, $S_2$ to the other inputs of 6 bit data selectors '28' and '30'.

From the second PCM word, when flip-flop '10' is clocked such second time, the four bits, representing $M_2$, $S_2$ are supplied to the other input of the 4 bit data selector '18' and 3 bits, representing $M_2$, are supplied to the input of 3 bit inverter '14'. (By "inverter" herein is meant a device which replaces the '1's in a binary number with '0's, and vice versa) thus M becomes, at the output of inverter '14', $\overline{M_2}$. The bar above the letter indicates, by convention, that the data is inverted.

The encoding of $\mu$-law and A—law, for M and P values is opposite. That is, no signal or the lack of signal in $\mu$-law appears as 1's, for all the M and P values, and in A-law, such lack of signals as 0's.

The 4 bit adder '20' is designed, at any time, to add the inputs of its A and B terminals in accord with either $\mu$-law or A-law inputs, as determined by the low "L" and high "H" respective inputs on A4 and B4. (The low and high respectively connections for A4 and B4 shown in the drawings are for $\mu$-law).

The adder '20' is connected to add the signals at its two inputs which, at the relevant time, is $M_1$ and $\overline{M_2}$ (the inverse of $M_2$). The carry digit from the three bit to three bit addition is supplied from the carry out 'C out', out of the adder, to a carry in input C in of the adder as the lowest order input. The effect of this connection plus that of the adder is to provide, using 2's complement arithmetic, the difference $M_1 - M_2$, to the input of exclusive OR gate '26'. The exclusive OR gates are devices which provide a high or '1' output when the inputs are different, and a '0' output when the inputs are the same. The 3 bit exclusive OR '26' provides 3 of such OR gates with the input from inverter '24', which may be considered as a control input, in each of the three gates paired with one line of the 3 bit input from adder '20'. The result is that when the control input is at a logic '0', each of the three outputs of exclusive OR gate '26' is the same as the input. When the control input is at a logic '1', each output of exclusive OR gate '26' is the inversion of its respective input. The 7 exclusive OR gates '36' and '52' work in a similar manner and the control gate is in each case identified by a 'C'. The carry '1' from C out (for $M_1 > M_2$) is provided to the control input of the 3 bit exclusive OR gate, through the inverter '24' as a '0'. The output of the exclusive OR is thus the same as the input, and is supplied to NOR gate '38', and also to the control input of the 6 bit binary bit position shifter '34'. It will be further noted that the carry from C out of adder '20', here a '1', is supplied to the select terminal 'sel' of 4 bit data selector '18', and the 'sel' terminal of both 6 bit data selectors '28' and '30'. If $M_2 > M_1$, it will be obvious that the sum of $M_1 - M_2$ has a '0' carry, and that the three bit line from the four bit adder to exclusive OR gate '26', has the inverse of $M_2 - M_1$. However, the '0' carry is applied through inverter '24' as a '1' to the control gate of the exclusive OR gate '26'. The result is that the output of the exclusive OR gate '26' provides the value $M_2 - M_1$ in ordinary binary value. Thus the output of the exclusive OR gate will provide $M_1 - M_2$ for $M_1 > M_2$, and $M_2 - M_1$ for $M_2 > M_1$. The carry out—"C out," is supplied to the 4 bit and the two bit data selectors, '18', '28', and '30'. Thus these three selectors receive a '1' input for $M_1 > M_2$ and a '0' input for $M_2 > M_1$, and are designed to select the desired output from the respective inputs, in accord therewith. The notation "$M_L$" and "$M_S$" will be used to represent the larger and smaller M. Thus given the '1' or '0' inputs, the four bit selector '18' is programmed to select and provide over four lines, the value $M_L S_L$ selected as $M_1 S_1$ if the input is '1', and $M_2 S_2$ if the input is '0', in accord with the signal from the 4 bit adder carry out. The same select signal from C out of adder '20' is used to select $Q_S$ from $Q_1$ or $Q_2$ at 6 bit data selector '28', and $Q_L$ from $Q_1$ or $Q_2$ at 6 bit data selector '30'. The designations $Q_L$ and $Q_S$ do not, of course, relate to the relative sizes of these qualities, but rather whether they are derived from the PCM word containing the larger or smaller $M_L$ or $M_S$. It should be noted that when $M_1 = M_2$, the device will select one of these as $M_L$ and the other as $M_S$. However, this does not interfere with the operation of the device since, whichever 'M' is selected as $M_L$ or $M_S$, the Q corresponding to the same PCM word, respectively is selected as $Q_L$ or $Q_S$. The efficiency of this method will be obvious from the description to follow.

It will be obvious that the lines where values S, M, P, or Q bear the subscript '2', have at another time borne signals properly bearing the subscript 1. However the latter signals are not used (in effect, ignored), by the circuitry so that the signals bearing the subscript 2 are the ones which are used by the circuitry.

The value Q derived from the PCM word containing value $M_S$, is provided to the input of a six bit position shifter '34'. The binary bit position shifter '36' is designed, as described previously, to register the 6 bit binary number $Q_S$, and to move the position of that number towards the least significant bit, the number of binary places indicated by the three bit signal $|M_1 - M_2|$, received from exclusive OR gate '26' at the control terminal of the 6 bit position shifter. The six bit binary bit position shifter '34' is provided with a seven bit output as shown, to carry in the output, the next lower binary place below the least significant binary digit of the input. The effect of the position shifter is to divide $Q_S$ by 2 for each position that $Q_S$ is moved towards the least significant bit.

The 6 bit value of $Q_L$ is supplied from data selector '30', to an input of eight bit adder '42', for addition to the values $Q_S/2^{ML-MS}$.

The value $Q_S/2^{ML-MS}$ must be added or subtracted from $Q_L$ depending on whether the sign corresponding to $M_L$ is or is not the same as the sign corresponding to $M_S$.

Accordingly, the binary indications of $S_1$ and $S_2$ are respectively supplied from flip-flop '22' and flip-flop '10' respectively, to the exclusive OR gate '32', which provides at its output a '0' if the signs are the same, and a '1' if they are different. The '1' or '0' signal is provided to the input of 7 bit exclusive OR gate '36'. At the exclusive OR gate '36', a '0' at control terminal C, indicating the signs are the same, acts to cause the exclusive OR gate '36' to transmit the 7 bit information to 8 bit adder '42' in the same form as received, so that outout of the adder, $Q_R$, is $Q_L + Q_S/2^{ML-MS}$. The '0' output from gate '32' at AND gate '44' produces a '0' at the "C in"

terminal of adder '42' when $S_1$ and $S_2$ are the same sign, whether the output of C out is '1' or '0'. At the exclusive OR gate '36', the presence of a '1' at the control terminal causes the output of the exclusive OR gate to be an inversion of the signal received from the 6 bit position shifter '34' (i.e. each '1'bit becomes a '0' and vice versa) so that if the signs are different, the output of the adder is $Q_L - Q_S/2^{ML-MS}$. The carry out '1' at "C out" of adder '42', if the term at input B is larger, produces a carry out '1' at C in, (since the other input to AND gate '44' is then a '1') to render the output of adder '42' correct under two's complement methods. The carry out '0', if the term at input B is smaller, produces a '0' through AND gate '44' to C in, but the '0' output from exclusive OR gate '32' at exclusive OR gate '48', together with the '0' output from AND gate '44', produces a '1' at 7 bit exclusive OR gate '46' which inverts the output of gate '46' to produce the correct result $(Q_L - Q_S/2^{ML-MS}) = (Q_R)$ at the output of gate '46.' If, with $S_1$ and $S_2$ different, the first term, $Q_L$ is greater than $Q_S/2^{ML-MS}$, the value $(Q_L - Q_S/2^{ML-MS})$ was correct at the output of the 8 bit adder, but the carry out is '1' producing a '0' at the input of 7 bit exclusive OR gate '46', so that the output here is also unchanged.

Thus there is supplied to the input of a 1024×7 bit convertor or look-up table '52'; from four bit data selector '18', the bit values for $M_L$ and the sign $S_L$ of the PCM word containing $M_L$ and from 7 bit exclusive OR gate '60', the value $Q_R$. The convertor, like convertor '16' is preferably a programmable read only memory which provides $M_R$ and $P_R$ values for the PCM signal representing the sum of the PCM words, in one-to-one relationship with the inputs $M_L$ and $Q_R$. The sign $S_R$ of the "sum" PCM word is determined by the following wired logic: If $M_1 \neq M_2$ then $S_L$ at exclusive OR gate '50' is correct, and the '0' from the output of negative AND gate '38' will produce a '0' through AND gate '40' to exclusive OR gate '50', so that S is provided at the output of exclusive OR gate '50' as S. If $M_1 = M_2$ but $Q_L > Q_S$, the carry out '1' from the eight bit adder will produce a '0' at the output of gate '40', so that $S_L$ is still correct and sent as $S_R$. However, where $M_1 = M_2$ and $Q_S > Q_L$, the carry out is '0', giving a '1' output from exclusive OR gate '48' and, together with the '1' output from gate '38', producing a '1' input at OR gate '50' via gate '40', which gives S the inverted sign, i.e. that of $\overline{S_L}$ (which equals $S_S$), at 8 bit flip-flop '54'. If $S_1 = S_2$, the outputs of gates '32', '44', '48' and '40' are '0's and the sign of $S_L$ is used as $S_R$. The information $S_R$, $M_R$, $P_R$ is registered in 8 bit D type flip-flop '54' when the latter is clocked.

The process described above is repeated cyclically for each pair of PCM words to be added.

Although the circuit elements described could be clocked to provide the operation of the elements free of transient and indeterminate states, it is preferred to allow these transient and indeterminate states to exist in the circuitry described, and to avoid the effects of these by selection of the time to clock the input and output D type flip-flops '10' and '54', and selection of times for clocking them. Thus the only "clocking operations" required by the circuitry in its preferred mode of operation are those for the flip-flops '10', '54', '14', and '22'.

The digital signals for PCM words are produced and supplied in sequence from source 1 and source 2 to flip-flop '10' by means, not shown, but well known to those skilled in the art.

In the preferred method of operation, input flip-flop '10' is clocked when a PCM word from source 1 to be summed is present at its input, providing at the output of flip-flop '10' the signals with '1' subscripts indicated on FIG. 2. These signals will remain on the lines emanating from the output of flip-flop '10' until the input flip-flop '10' is again clocked. During the time that the signal from source 1 are on the line, flip-flops '14' and '22' are clocked to provide the signals corresponding to source 1 at their output. Input flip-flop '10' is then clocked again when a word from PCM source 2 is at its input. This PCM word from source 2 is then supplied to the same inputs as the word from source 1. However, the outputs from flip-flops '14' and '22' are unchanged, since these flip-slops are not clocked while the source 2 signal is present at their inputs. Thus the circuit components perform their operations on the source 1 and source 2 words described. It will be understood that the results at the input of flip-flop '54' are independent and indeterminate for a predetermined period after the insertion of the source 1 and source 2 information. After the circuit has both source inputs (as above described), and time has been allowed for conditions to become quiescent, the output flip-flop '54' is clocked, providing the output information. The cycle may then be repeated.

In practice, the maximum time for the circuit to become quiescent is about 80–100 nS (nano seconds); while two successive signals from source 1 or source 2 are supplied, about 488 nS apart and it will be obvious that the clocking of the input flip-flop—to provide a signal from source 2, after clocking for a signal from source 1—should be spaced by at least 100 nS, and that after insertion of the second signal in the system, there should be allowed at least 100 nS before the ouput flip-flop is clocked.

It will be noted that the Q of the larger signal could have been shifted up, i.e. $(Q_S + Q_L/2^{MS-ML})$ could have been calculated with conforming alteration of logic. However, this leads to less resolution and potentially less accurate results than the calculation of $(Q_L + Q_S/2^{ML-MS})$, as in the preferred embodiment. If A-law is used in the PCM words instead of µ-law, the high and low connections A4 and B4 of 4 bit adder '20', must be reversed, and the convertors '16' and '52' will be replaced by convertors wired for A-law.

It will be obvious from consideration of the invention disclosed herein that such invention is equally applicable to a PCM code of more or less than eight bits where the segment number "M" may have more or less than three bits and the segment value P may have more or less than 4 bits.

We claim:

1. Means for cyclically combining the digital representations of two audio analog samples in a circuit where each digital representation is a multiple bit PCM word where one bit represents the sign, a first predetermined number of bits represent M, the number of the segment numbered serially in each sense from zero analog signal, and a second predetermined number of bits represent P, the value in the segment, where each increment of segment value in a segment represents twice the audio analog increment of a similar increment of segment value in the segment of next lower value, comprising:

means for detecting such two PCM words, means for determining from such two PCM words the values M of the numbers of the respective segments M of the words, means for determining that one of such values $M_L$ is at least as large as the other $M_S$, means for determining from the two detected PCM words, the values $Q_L$ and $Q_S$, respectively where the analogue values $D_L$ and $D_S$ of the corresponding samples are:

$$D_L = Q_L \, 2^{M_L}$$

$$D_S = Q_S \, 2^{M_S}$$

means for determining the value $$\frac{Q_S}{2^{M_L - M_S}}$$

means for determining the sum $$\frac{Q_S}{2^{M_L - M_S}} + Q_L$$

means for determining for such sum and $M_L$ the values of P and M required for the representation in the PCM code of the value $D = D_L = D_S$, means for determining the sign for said last mentioned representation.

2. Means as claimed in claim 1 wherein said means for determining the value $$\frac{Q_S}{2^{M_L - M_S}}$$

comprises a binary bit position shifter, means for entering the value of $Q_S$ therein and for shifting down the binary number thus entered the number of binary places equal to $M_L - M_S$.

3. Means as claimed in claim 1 wherein:
said means for determining the values $Q_L$ and $Q_S$ comprises a hard wired convertor designed to provide for a given combination of M and P values a corresponding value of Q.

4. Means as claimed in claim 2 wherein:
said means for determining the values $Q_L$ and $Q_S$ comprises a hard wired convertor designed to provide for a given combination of M and P values a corresponding value of Q.

5. Means as claimed in claim 3 wherein
said means for determining for such sum and $M_L$ the values of P and M, includes a hard wired convertor designed to provide for a given combination for such sum and $M_L$ the values of P and M.

6. Means as claimed in claim 4 wherein
said means for determining for such sum and $M_L$ the values of P and M, include a hard wired convertor designed to provide for a given combination for such sum and $M_L$ the values of P and M.

7. Means for combining the coded digital representations of two audio analog samples in a circuit where each digital representation is a multiple bit PCM word where one bit represents the sign, a first predetermined number of bits represent M, the number of the segment numbered serially in each sense from zero analog signal and a second predetermined number of bits represent P, the value in the segment, where each increment of digital value in a segment represents twice the audio analog increment of a similar increment of digital value in the segment of next lower value, comprising:

inputs means for receiving said digital representations, means to determine from said representations the segment number corresponding to each of said digital representations, means to determine for each of said digital representations a factor whereby the product of the factor multiplied by two to the exponent having the value of the segment number corresponding to the representation corresponds to the analog value for such digital representation, means to determine the difference in the segment numbers of said digital representations, means to convert the factor corresponding to one of the digital representations into a converted factor whereby the product of the converted factor multiplied by two to the exponent having the value of the segment number corresponding to the other of said digital representations corresponds to the analog value for such one of said digital representations, means to add the converted factor corresponding to said one digital representation to the factor corresponding to the other digital representation to produce a sum, means responsive to said sum and such segment number of said other digital representation to produce the M and P components of said PCM word representing an analogue value corresponding to the value represented by said sum multiplied by two to the exponent of said other segment number, means for determining the sign of said last mentioned PCM word.

8. Means as claimed in claim 7 wherein said means to convert is designed and connected to convert the factor corresponding to the digital representation having the smaller segment number.

9. Means as claimed in claim 7 wherein said means for converting comprises entering the factor to be converted, as a binary number, into a binary bit position shifter and for shifting downwardly the binary number thus entered the number of binary places equal to the difference between the larger and the smaller segment number.

10. Means as claimed in claim 7 wherein said means for determining said factor comprises a hard wired convertor designed to provide such factor for a given combination of M and P.

11. Means as claimed in claim 8 wherein said means for determining said factor comprises a hard wired convertor designed to provide such factor for a given combination of M and P.

12. Means as claimed in claim 9 wherein said means for determining said factor comprises a hard wired convertor designed to provide such factor for a given combination of M and P.

13. Means as claimed in claim 10 wherein said means responsive to said sum and said segment number comprises a hard wired convertor responsive to said sum and said last mentioned segment number to provide said last mentioned M and P components.

14. Means as claimed in claim 11 wherein said means responsive to said sum and said segment number comprises a hard wired convertor responsive to said sum and said last mentioned segment number to provide said last mentioned M and P components.

15. Means as claimed in claim 12 wherein said means responsive to said sum and said segment number comprises a hard wired convertor responsive to said sum and said last mentioned segment number to provide said last mentioned M and P components.

* * * * *